US011464017B1

(12) United States Patent
Chopra et al.

(10) Patent No.: US 11,464,017 B1
(45) Date of Patent: Oct. 4, 2022

(54) FACILITATION OF BEAMFORMING UTILIZING INTERPOLATION FOR 5G OR OTHER NEXT GENERATION NETWORK

(71) Applicant: AT&T Intellectual Property I, L.P., Atlanta, GA (US)

(72) Inventors: Aditya Chopra, Austin, TX (US); Andrew Thornburg, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/212,940

(22) Filed: Mar. 25, 2021

(51) Int. Cl.
*H04W 72/04* (2009.01)

(52) U.S. Cl.
CPC ....... *H04W 72/048* (2013.01); *H04W 72/044* (2013.01)

(58) Field of Classification Search
CPC ............. H04W 72/04; H04W 72/0406; H04W 72/0426; H04W 72/044; H04W 72/046; H04W 72/048; H04W 72/0493
See application file for complete search history.

(56) References Cited

U.S. PATENT DOCUMENTS

| | | | |
|---|---|---|---|
| 8,750,358 B2 | 6/2014 | Yue et al. | |
| 8,934,565 B2 | 1/2015 | Kotecha et al. | |
| 9,048,909 B2 | 6/2015 | Zhang et al. | |
| 9,197,372 B2 * | 11/2015 | Zhu | H04B 7/0413 |
| 9,307,421 B2 | 4/2016 | Taori et al. | |
| 9,468,000 B2 | 10/2016 | Bachu et al. | |
| 9,537,556 B2 | 1/2017 | Zhou et al. | |
| 9,590,707 B1 | 3/2017 | Baik et al. | |
| 9,647,736 B1 | 5/2017 | Schelstraete | |
| 9,838,227 B2 | 5/2017 | Sahin et al. | |
| 9,787,379 B2 | 10/2017 | Onggosanusi et al. | |
| 9,954,649 B2 | 4/2018 | Jana et al. | |

(Continued)

FOREIGN PATENT DOCUMENTS

| | | |
|---|---|---|
| CN | 104579443 A | 4/2015 |
| JP | 2019-501556 | 1/2019 |

(Continued)

OTHER PUBLICATIONS

Non-Final Office Action received for U.S. Appl. No. 16/059,642 dated May 9, 2019, 18 pages.

(Continued)

*Primary Examiner* — Siu M Lee
(74) *Attorney, Agent, or Firm* — Amin, Turocy & Watson, LLP

(57) ABSTRACT

Disaggregated wireless radio access networks can utilize a lower physical split architecture with open fronthaul between the radio unit and distributed baseband units. A split architecture is one in which the analogue radio front-end and the digital baseband processor in a radio are not co-located. Instead, these components are connected via a fronthaul transport network. Therefore, the baseband unit can transmit two beamforming matrices for every contiguous resource block occupied by a user. The radio unit can then interpolate between these two beamforming matrices for each of the RE inside of the resource block based on the baseband unit and the radio unit agreeing upon a method of interpolation to generate beamforming matrices per resource element.

20 Claims, 10 Drawing Sheets

(56) References Cited

U.S. PATENT DOCUMENTS

| | | | |
|---|---|---|---|
| 9,973,249 | B2 | 5/2018 | Onggosanusi et al. |
| 10,028,274 | B2 | 7/2018 | Padfield et al. |
| 11,184,067 | B1* | 11/2021 | Bakr .................. H04W 72/044 |
| 2009/0046582 | A1 | 2/2009 | Sarkar et al. |
| 2010/0015923 | A1 | 1/2010 | Golitschek |
| 2010/0278033 | A1 | 11/2010 | Ilani |
| 2012/0039172 | A1 | 2/2012 | Kim et al. |
| 2012/0263210 | A1 | 10/2012 | Panah et al. |
| 2013/0315328 | A1 | 11/2013 | Liu |
| 2014/0357286 | A1 | 12/2014 | Jeon et al. |
| 2015/0124688 | A1 | 5/2015 | Xu et al. |
| 2017/0223701 | A1 | 8/2017 | Bendle et al. |
| 2017/0359104 | A1 | 12/2017 | Pan et al. |
| 2018/0013581 | A1 | 1/2018 | Fertonani et al. |
| 2018/0019899 | A1 | 1/2018 | Kuchi |
| 2018/0212711 | A1 | 7/2018 | Zhu et al. |
| 2018/0310244 | A1 | 10/2018 | Wich et al. |
| 2019/0074885 | A1 | 3/2019 | Chen et al. |
| 2019/0199379 | A1* | 6/2019 | Österling ............. H04W 88/02 |
| 2019/0335445 | A1* | 10/2019 | Forenza ................. H04B 7/024 |
| 2020/0021343 | A1 | 1/2020 | Liu |
| 2020/0029229 | A1 | 1/2020 | Harada et al. |
| 2020/0044801 | A1 | 2/2020 | Wang et al. |
| 2020/0067581 | A1 | 2/2020 | Osawa et al. |
| 2020/0235875 | A1* | 7/2020 | Sha ....................... H04W 72/04 |

FOREIGN PATENT DOCUMENTS

| | | |
|---|---|---|
| JP | 2019-518348 | 6/2019 |
| KR | 10-1382420 B1 | 4/2014 |
| KR | 10-1803030 B1 | 12/2017 |
| WO | 2014/092034 A1 | 6/2014 |
| WO | 2014/198068 A1 | 12/2014 |
| WO | 2016/007757 A1 | 1/2016 |
| WO | 2017/004546 A1 | 1/2017 |
| WO | 2017/040002 A1 | 3/2017 |
| WO | 2017067791 | 4/2017 |
| WO | 2017/142551 A1 | 8/2017 |
| WO | 2017/162143 A1 | 9/2017 |
| WO | 2017/166219 | 10/2017 |
| WO | 2017/180485 A1 | 10/2017 |
| WO | 2018048332 A1 | 3/2018 |
| WO | 2018/058600 A1 | 4/2018 |
| WO | 2018/095526 A1 | 5/2018 |

OTHER PUBLICATIONS

Kang, Jinkyu, et al. "Layered Downlink Precoding for C-RAN Systems with Full Dimensional MIMO." srXiv:1511.08084v1 [cs.IT] Nov. 25, 2015. 29 pages.

Kang, Jinkyu, et al. "Fronthaul Compression and Precoding Design for C-RANs over Ergodic Fading Channels." arXiv:1412.7713v1 [cs IT] Dec. 21, 2014. 25 pages.

Park, Jihong, et al. "Hybrid Precoding for Massive MIMO Systems in Cloud RAN Architecture with Capacity-Limited Fronthauls." arXiv:1709.07963v1 [cs.IT] Sep. 22, 2017. 13 pages.

Peng, Mugen, et al. "Fronthaul-Constrained Cloud Radio Access Networks: Insights and Challenges." arXiv:1503.01187v1 [cs IT] Mar. 4, 2015. 22 pages.

Zhou, et al. "Fronthaul Compression and Transmit Beamforming Optimization for Multi-Antenna Uplink G-RAN." IEEE Transactions on Signal Processing, 2016. 14 pages.

Non-Final Office Action received for U.S. Appl. No. 16/059,680 dated Nov. 7, 2018, 33 pages.

Peng et al., "Fronthaul-Constrained Cloud Radio Access Networks: Insights and Challenges", IEEE Wireless Communications, 2015, pp. 1-22.

Park et al., "Inter-Cluster Design of Precoding and Fronthaul Compression for Cloud Radio Access Networks", IEEE Wireless Communications Letters, vol. 3, No. 4, 2014, pp. 369-372.

Vu et al., "Adaptive Compression and Joint Detection for Fronthaul Uplinks in Cloud Radio Access Networks", IEEE Transactions on Communications, vol. 63, No. 11, 2015, pp. 4565-4575.

Non-Final Office Action received for U.S. Appl. No. 16/421,586 dated Jul. 18, 2019, 26 pages.

International Search Report and Written Opinion received for International Patent Application No. PCT/US2019/045803 dated Nov. 5, 2019, 20 pages.

Sayeed, et al. "Beamspace MIMO for high-dimensional multiuser communication at millimeter-wave frequencies." 013 IEEE Global Communications Conference (GLOBECOM), IEEE, Dec. 9, 2013 (Dec. 9, 2013), pp. 3679-3684, XP032604916, DOI: 10.1109/GLOCOM.2013.6831645 [retrieved on Jun. 11, 2014], 6 pages.

Nadeem, et al. "Elevation Beamforming with Full Dimension MIMO Architectures in 5G Systems: A Tutorial", arxiv.org, Cornell University Library, 201 OLIN Library Cornell University Ithaca NY 14853, May 1, 2018 (May 1, 2018), XP081367583, 37 pages.

Office Action dated Mar. 16, 2020 for U.S. Appl. No. 16/575,897, 19 pages.

Office Action dated Mar. 19, 2020 for U.S. Appl. No. 16/702,003, 28 pages.

Office Action dated Sep. 2, 2021 for Indian Patent Application No. 202147005468, 6 pages.

Decision to Grant dated Mar. 28, 2022 for Japanese Patent Application No. 2021-506987, 54 pages.

Qualcomm Incorporated, "Discussion on advanced CSI reporting and initial evaluation results" [online], 3GPP TSG-RAN WG 1#86R1-166274, the Internet<URL:http://www.3gpp.org/ftp/tsg_ran/WG1_RL1/TSGR1_303/Docs/R1-166274.zip>, Aug. 26, 2016, 6 pages.

"3rd Generation Partnership Project; Technical Specification Group Radio Access Network; NR; Physical layer General description (Release 16)", 3GPP TS 38.201 V16.0.0 (Dec. 2019), Dec. 2019, 13 pages.

* cited by examiner

| FIELD TYPE | nOctets | |
|---|---|---|
| ef | 1 | Octet N |
| extType = 0x1 | | |
| extLen | 1 | Octet N+1 |
| bfwCompHdr | 1 | Octet N+2 |
| bfwCompParam | var | Octet N+3 |
| bfwI (for TRX 0) | var | |
| bfwQ (for TRX0) | var | |
| remaining beamforming weights bfwI and bfwQ up to K TRXs | var | |
| zero pad to 4-byte boundary | | |

FIG. 3

FACILITATION OF BEAMFORMING UTILIZING INTERPOLATION FOR 5G OR OTHER NEXT GENERATION NETWORK

TECHNICAL FIELD

This disclosure relates generally to facilitating beamforming utilizing interpolation. For example, this disclosure relates to facilitating transmission of beamforming coefficients across a radio access network fronthaul for a 5G, or other next generation network, air interface.

BACKGROUND

5th generation (5G) wireless systems represent a next major phase of mobile telecommunications standards beyond the current telecommunications standards of 4th generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to beamforming utilizing interpolation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 illustrates an example schematic system block diagram of a messaging format for beamforming weights according to one or more embodiments.

DETAILED DESCRIPTION

Figure 1:
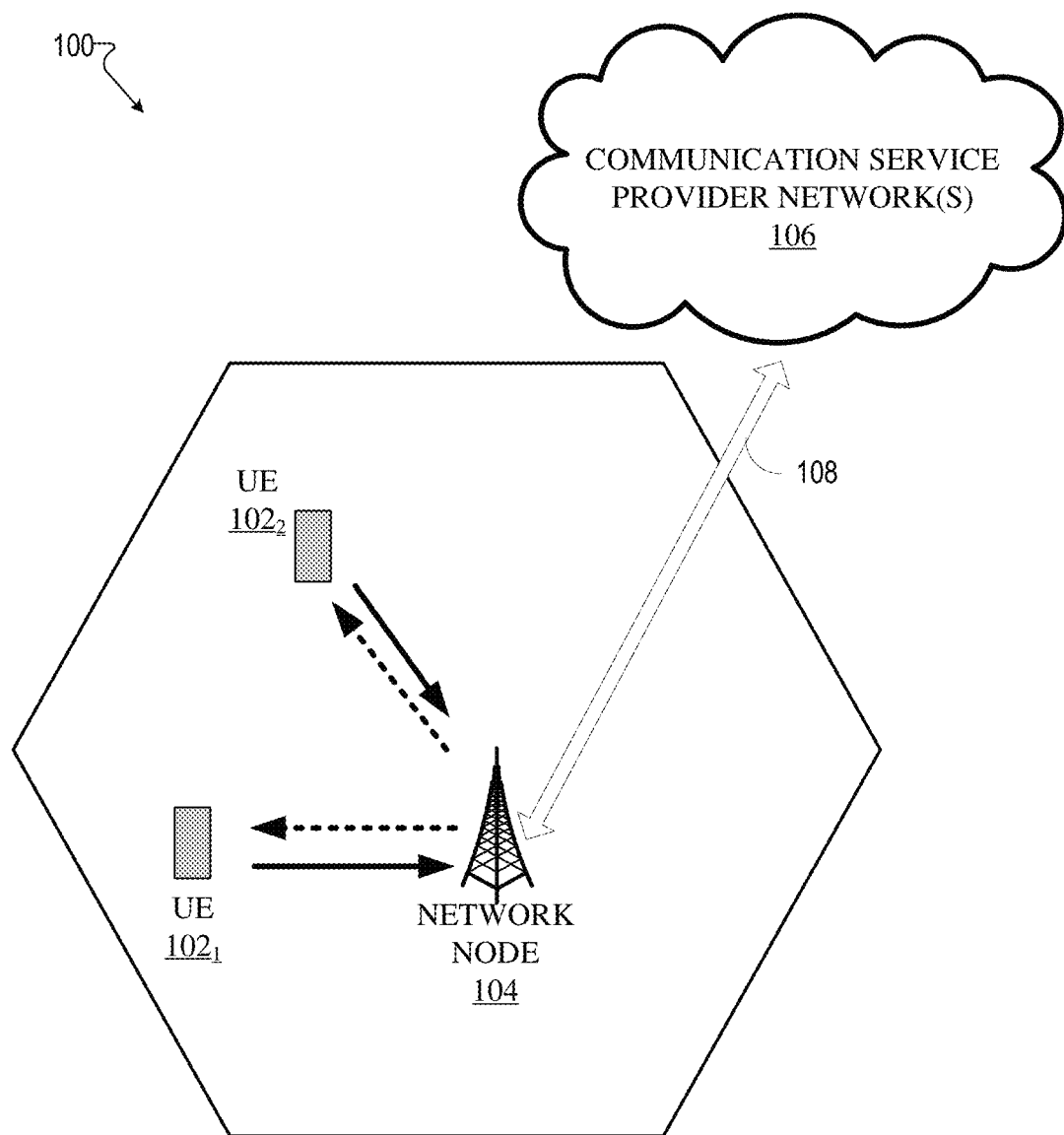
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate beamforming utilizing interpolation for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate beamforming utilizing interpolation for a 5G network. Facilitating beamforming utilizing interpolation for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, IOT device, laptop embedded equipped (LEE), laptop mounted equipment (LME), USB dongles, etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

This disclosure discusses disaggregated wireless radio access networks, and in particular, access networks utilizing lower PHY split architecture with open fronthaul between the radio unit and distributed baseband units. A split architecture is one in which the analogue radio front-end and the digital baseband processor in a radio are not co-located. Instead, these components are connected via a fronthaul transport network. In particular, these components are connected via fronthaul for massive MIMO or digital beamformed radio architectures where the radio unit performs digital beamforming by receiving input data and beamforming coefficients from the distributed baseband processing unit.

In radio access networks utilizing massive MIMO technology, the radio controller can estimate the massive MIMO channel between itself and the user. Using this massive MIMO channel, the radio unit can then optimize both downlink and uplink traffic to and from the spatial direction of the user. The spatial direction is not necessarily a 3D direction vector, but is another way to describe the optimal transmission or receiving beamforming matrix that will maximize the signal power coming from or going to the user. Therefore, the baseband system can indicate as best as possible the correct beamforming matrix for the RU to use. In current open fronthaul systems, a single beamforming matrix can be used for the entire resource block occupied by the user. A resource block may contain multiple physical resource blocks (PRBs) that each are a group of 12 adjacent resource elements (REs) or frequency carriers. However, the single beamforming matrix may not be the optimal matrix for all of the REs that are being occupied by the user transmissions. Sending a beamforming matrix for every single RE can require a large amount of fronthaul throughput and may not be sustainable for high load scenarios with typical fronthaul fiber deployments.

Therefore, in this disclosure, the baseband unit can transmit two beamforming matrices for every contiguous resource block occupied by a user. The radio unit can then interpolate between these two beamforming matrices for each of the RE inside of the resource block. The baseband unit and the radio unit can agree upon a method of interpolation, say linear interpolation, that the radio unit can use to generate beamforming matrices per RE.

The proposed solution allows a split architecture massive MIMO RAN to optimize the beamforming used to transmit and receive from multiple users, while using only slightly increasing the fronthaul throughput to do so. Massive MIMO systems typically use frequencies with inherently lossy transmission (midband and above), and it is critical for coverage reasons that the signal power received from and delivered to the user is maximized. The proposed solution adds a method to existing open fronthaul specifications to improve user signal to noise ratio (SNR) and consequently RAN coverage.

For next generation 5G RANs, there is a split between the baseband unit and the radio unit. The baseband unit (DU) can perform the baseband processing and the radio unit (RU) can get the signal that it needs to transmit from the baseband unit prior to sending the signal out. The DU and RU can be geographically separate and connected via a packet switched network. The DU can send the downlink data for the RU to transmit. If there is one transmitter, then the DU can send in phase and quadrature (IQ) data that is needed to be transmitted. However, for massive MIMO, there can be a radio with 64, 128, or 256 transmitters, where it is inefficient to send 256 streams of IQ data. Instead, beamforming can take on spatial stream and multiply it by a 256 element matrix to perform directional transmissions once the data has been sent to all 256 antennas. Thus, instead of sending 256 IQ steams, only one IQ spatial stream is sent and then the 256 coefficient matrix is sent separately. Then, the RU can utilize the IQ stream and matrix to perform matrix expansion by multiplication and then generate the 256 signals that it needs to transmit on the 256 antennas.

However, for a chunk of data in certain resource elements beaming can be inefficient. For example, if a user is scheduled for eight resource blocks and the data and beamforming coefficient is sent by the DU but only one beamforming coefficient is sent, then only one beamforming coefficient covering eight resource blocks can be inefficient because the channel can change over the resource blocks. Thus, when the DU designs a beamforming coefficient, it can only design the beamforming coefficient based on the average channel condition and not necessarily the channel for each resource block. Therefore, sending one beamforming coefficient for a user's scheduled frequency region may not be sufficient.

Although the channel value can change, it may not change by a lot. If one coefficient is not enough, then more than the one coefficient per resource element (RE) can be sent (e.g., sending one for each resource element), but that too is not optimal based on the transmission process. However, sending one coefficient at each end of the scheduled regions can address these inefficiencies. The scheduled region is a block of frequency. In each RB there are 12 contiguous REs. Thus, at the lowest (e.g., first) resource element, the coefficient can be sent, and then the coefficient for the highest (e.g., last)

resource element can be sent. Consequently, the RU can know that the DU is sending the coefficient at each end and the RU can interpolate between those two in a linear manner. It should be noted that multiple types of interpolations can be utilized (e.g., spline, quadratic, piecewise, polynomial, etc.). The interpolation at each end can provide improved performance because it is now closer to an optimal solution.

In one embodiment, described herein is a method comprising receiving, by distributed unit equipment comprising a processor, capability data representative of a capability of radio unit equipment. Based on the capability data, the method can comprise enabling, by the distributed unit equipment, a feature shared between the distributed unit equipment and the radio unit equipment, resulting in an enabled feature. Based on the enabled feature, the method can comprise sending, by the distributed unit equipment to the radio unit equipment, an in-phase quadratic signal. Furthermore, based on a first resource element and a last resource element of a contiguous block of resource elements, the method can comprise generating, by the distributed unit equipment, matrix data representative of a matrix to be sent to the radio unit equipment. Additionally, in response to generating the matrix data, the method can comprise sending, by the distributed unit equipment, the matrix data to the radio unit equipment.

According to another embodiment, a system can facilitate, receiving capability data representative of a capability of radio unit equipment. Based on the capability data, the system can comprise enabling a feature shared between distributed unit equipment and the radio unit equipment, resulting in an enabled feature. The system can facilitate using the enabled feature, transmitting an in-phase quadratic signal to the radio unit equipment. Based on a first resource element value and a last resource element value associated with a resource element block, the system can facilitate generating a matrix to be sent to the radio unit equipment. Furthermore, in response generating the matrix, the system can facilitate transmitting matrix data representative of the matrix to the radio unit equipment.

According to yet another embodiment, described herein is a machine-readable medium that can perform the operations comprising receiving capability data representative of a capability of a radio unit. Based on the capability data, the machine-readable medium can perform the operations comprising enabling a feature shared between a distributed unit and the radio unit, resulting in an enabled feature. Based on the enabled feature, the machine-readable medium can perform the operations comprising transmitting an in-phase quadratic signal to the radio unit. Additionally, based on a first resource element value and a last resource element value of contiguous resource element blocks, the machine-readable medium can perform the operations comprising generating matrix data representative of a matrix to be sent to the radio unit. Furthermore, in response generating the matrix, the machine-readable medium can perform the operations comprising transmitting the matrix data to the radio unit.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
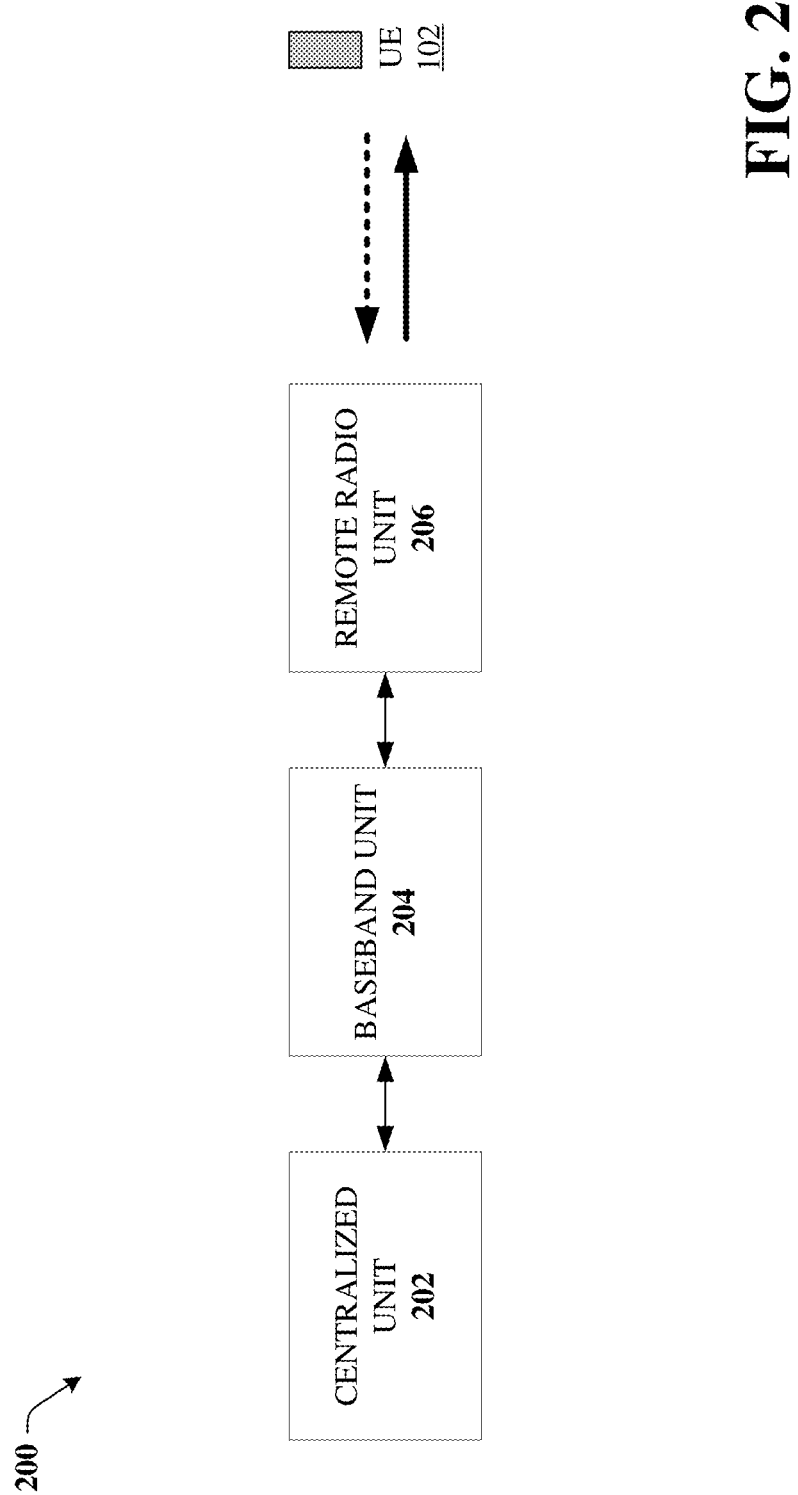
FIG. 2 illustrates an example schematic system block diagram of a cloud radio access network architecture according to one or more embodiments.

Referring now to FIG. 2, illustrated is an example schematic system block diagram of a cloud radio access network architecture 200 according to one or more embodiments. The cloud radio access networks (C-RAN) also called centralized RAN is a cellular architecture where the baseband digital units (DU) 204 can be centralized as a virtual resource pool and the remote radio units (RU) 206 can be located at places which are up to several miles away from the DU 204 and or centralized unit (CU) 202. FIG. 2 depicts the block diagram of the C-RAN. The link between DU 204 and the RU 206 is called a front haul.

In an embodiment, there can be a CU 202 that performs upper level medium access control (MAC), a DU 204 that performs lower level MAC and physical layer functionality, and an RU 206 that can transmit and receive RF signals and convert analog signals to digital signals and vice versa. Each of the CU 202, DU 204, and RU 206 can be linked via a fiber optical network or other high bandwidth front haul network. To reduce complexity and bandwidth, the transmissions sent between the CU 202, DU 204, and RU 206 can be digital, so the RU 206 can receive analog signals and convert the analog RF signals to digital before transmitting to the DU 204. Similarly, the RU 206 can receive a digital transmission comprising the IQ data and beamforming coefficients, perform the digital beamforming, and perform a digital to analog conversion at the RU 206.

The network node 104 can employ beamforming when transmitting to the UE 102. Beamforming is a signal processing technique used in sensor arrays for directional signal transmission or reception. This is achieved by combining elements in an antenna array in such a way that signals at particular angles experience constructive interference while others experience destructive interference.

Beamforming can be used at both the transmitting and receiving ends in order to achieve spatial selectivity. The improvement compared with omnidirectional reception/transmission is known as the directivity of the array. In the wireless communications context, a traffic-signaling system for cellular base stations that identifies the most efficient data-delivery route to a particular user, and it reduces interference for nearby users in the process. Depending on the situation and the technology, there are several ways to implement it in 5G networks.

Beamforming can help massive MIMO arrays, which are base stations arrayed with dozens or hundreds of individual antennas, to make more efficient use of the spectrum around them. The primary challenge for massive MIMO is to reduce interference while transmitting more information from many more antennas at once. At massive MIMO base stations, signal-processing algorithms plot the best transmission route through the air to each user. Then they can send individual data packets in many different directions, bouncing them off buildings and other objects in a precisely coordinated pattern. By choreographing the packets' movements and arrival time, beamforming allows many users and antennas on a massive MIMO array to exchange much more information at once. During beamforming, a data stream can be used to generate multiple data streams, each corresponding to an antenna port, and the data streams can each be modified based on a beamforming vector.

Frequency modulated IQ data can have "L" CSI-RS ports, where L is the number of layers associated with the data, and F tones before beamforming A=L×F matrix). After beamforming, the IQ data has P ports (each antenna) and F tones (B=P×F matrix). In digital beamforming, P2 is a P×L matrix where the rows of the matrix correspond to the number of ports, and columns correspond to the number of layers. This means that B=P2×A.

Figure 4:
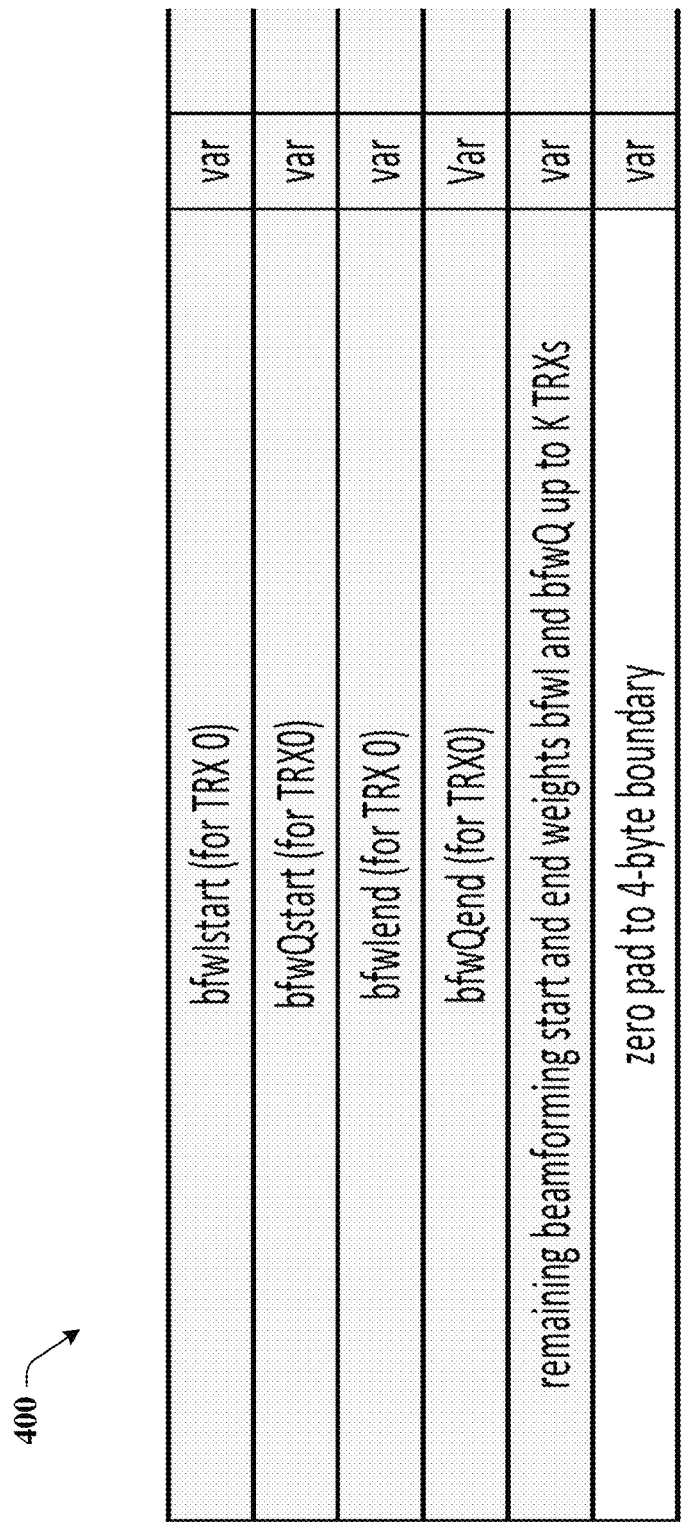
FIG. 4 illustrates an example schematic system block diagram of a messaging format for interpolated beamforming weight transmission according to one or more embodiments.

Referring now to FIG. 3 and FIG. 4, illustrated is an example schematic system block diagram of a messaging format for beamforming weights according to one or more embodiments.

In Table 300, the string "bfwCompHdr" can be used to represent a compression type indicator. Thusly, values (e.g., values 0,1,2,3,4, etc.) can be chosen to indicate interpolated beamforming. The string "bfwCompParam" can be used to indicate which interpolation method is being used and any potential tuning parameters associated with the interpolation method. For example, for interpolated weight transmission, the beamforming weights can be indicated in the manner depicted in FIG. 3. Additionally, the beamforming wave compression header (e.g., bfwCompHdr) can be utilized to determine the type of compression to be used.

As outlined in this disclosure, agreement of the interpolation metric to be used can be based on the compression type and/or any parameters related to the compression (e.g., how many XXXX are being used for each coefficients). As opposed to FIG. 3, the Table 400 in FIG. 4 illustrates that the I and Q weights can be sent at the beginning (e.g., first RE) of the resource block (e.g., bfwIstart, bfwQstart) and the I and Q weights can be sent at the ending (e.g., last RE) of the resource block (e.g., bfwIend, bfwQend).

Figure 5:
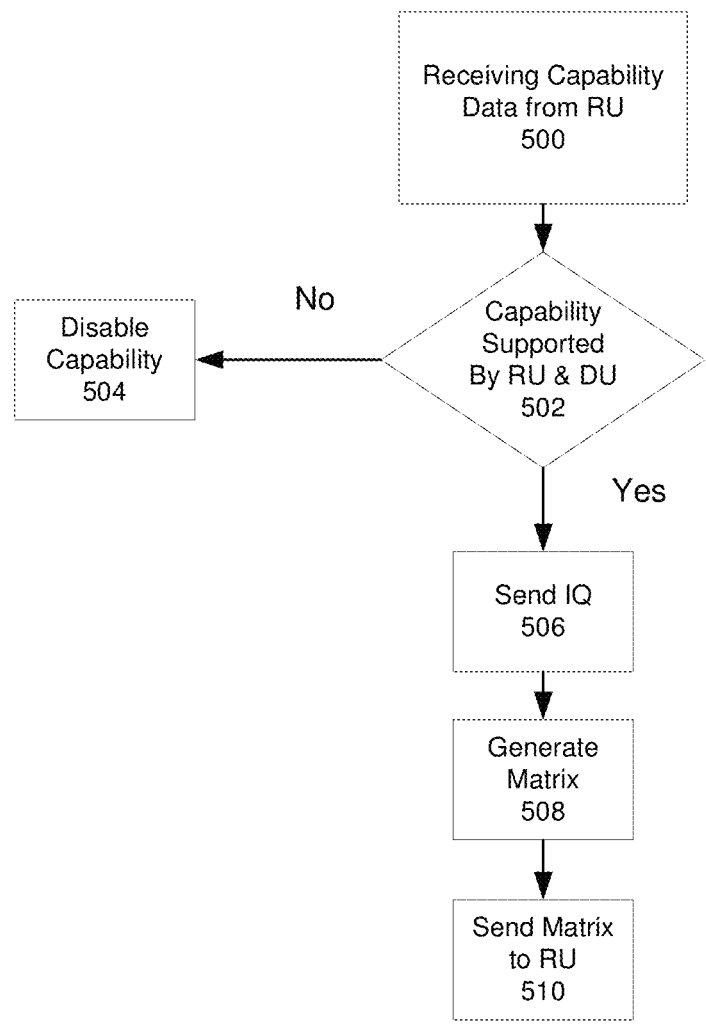
FIG. 5 illustrates an example schematic system block diagram of an interpolation process according to one or more embodiments.

Referring now to FIG. 5 illustrates an example schematic system block diagram of an interpolation process according to one or more embodiments.

During initial configuration, at block 500, the DU 204 receive data from the RU 206 and they can agree on which type of interpolation to perform. For example, the RU 206 and the DU 204 can each provide the other unit with the types of capabilities that each support. The capabilities that both the RU 206 and the DU 204 can support then become the features that the DU 204 can enable. Some capabilities can be optional and other capabilities can be mandatory. If the RU 206 and DU 204 do not have the same optional capabilities, then they can just not use that feature. However, if the capability is a mandatory capability, then both the RU 206 and the DU 204 must support the capability or they would be non-compliant to the standard. Consequently, if the capability is not supported by the RU 206 and/or the DU 204 at block 502, then use of such a capability can be disabled, for purposes of this disclosure, at block 504. However, if the capability is supported by the RU 206 and/or the DU 204 at block 502, then the DU 204 can send IQ data to the RU 206 at block 506 and generate matrix based on the first RE and the last RE at block 508. Thereafter, the DU 204 can send the beamforming matrices to the RU 206, at block 510, based on knowledge of the RF channel of the UE 102 that the RU is trying to beamform to.

Figure 6:
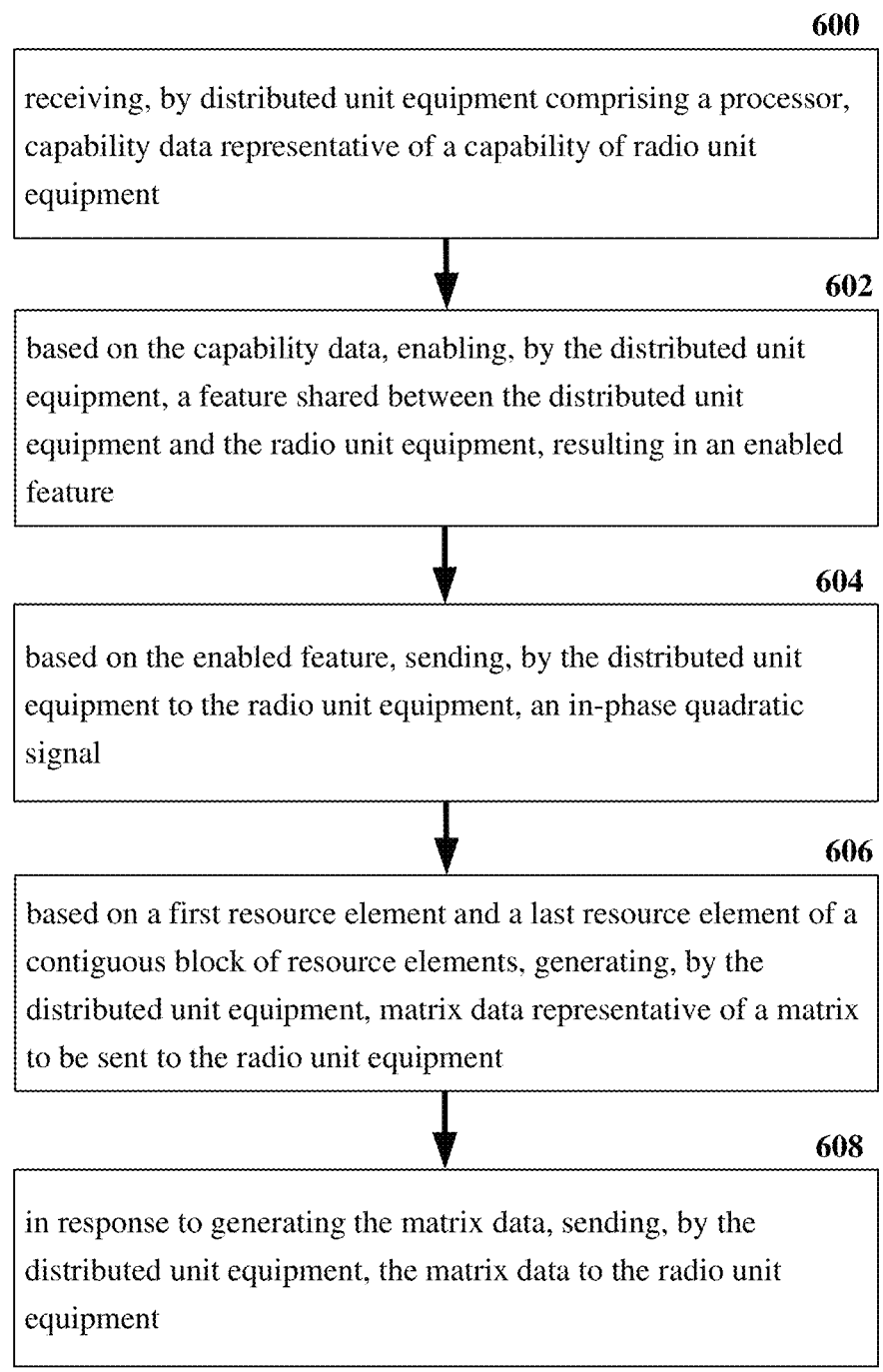
FIG. 6 illustrates an example flow diagram for a method for facilitating beamforming utilizing interpolation for a 5G network according to one or more embodiments.

Referring now to FIG. 6, illustrated is an example flow diagram for a method for facilitating beamforming utilizing interpolation for a 5G network according to one or more embodiments.

At element 600, the method can comprise receiving, by distributed unit equipment comprising a processor, capability data representative of a capability of radio unit equipment. Based on the capability data, at element 602, the method can comprise enabling, by the distributed unit equipment, a feature shared between the distributed unit equipment and the radio unit equipment, resulting in an enabled feature. Based on the enabled feature, at element 604, the method can comprise sending, by the distributed unit equipment to the radio unit equipment, an in-phase quadratic signal. Furthermore, at element 606, based on a first resource element and a last resource element of a contiguous block of resource elements, the method can comprise generating, by the distributed unit equipment, matrix data representative of a matrix to be sent to the radio unit equipment. Additionally, at element 608, in response to generating the matrix data, the method can comprise sending, by the distributed unit equipment, the matrix data to the radio unit equipment.

Figure 7:
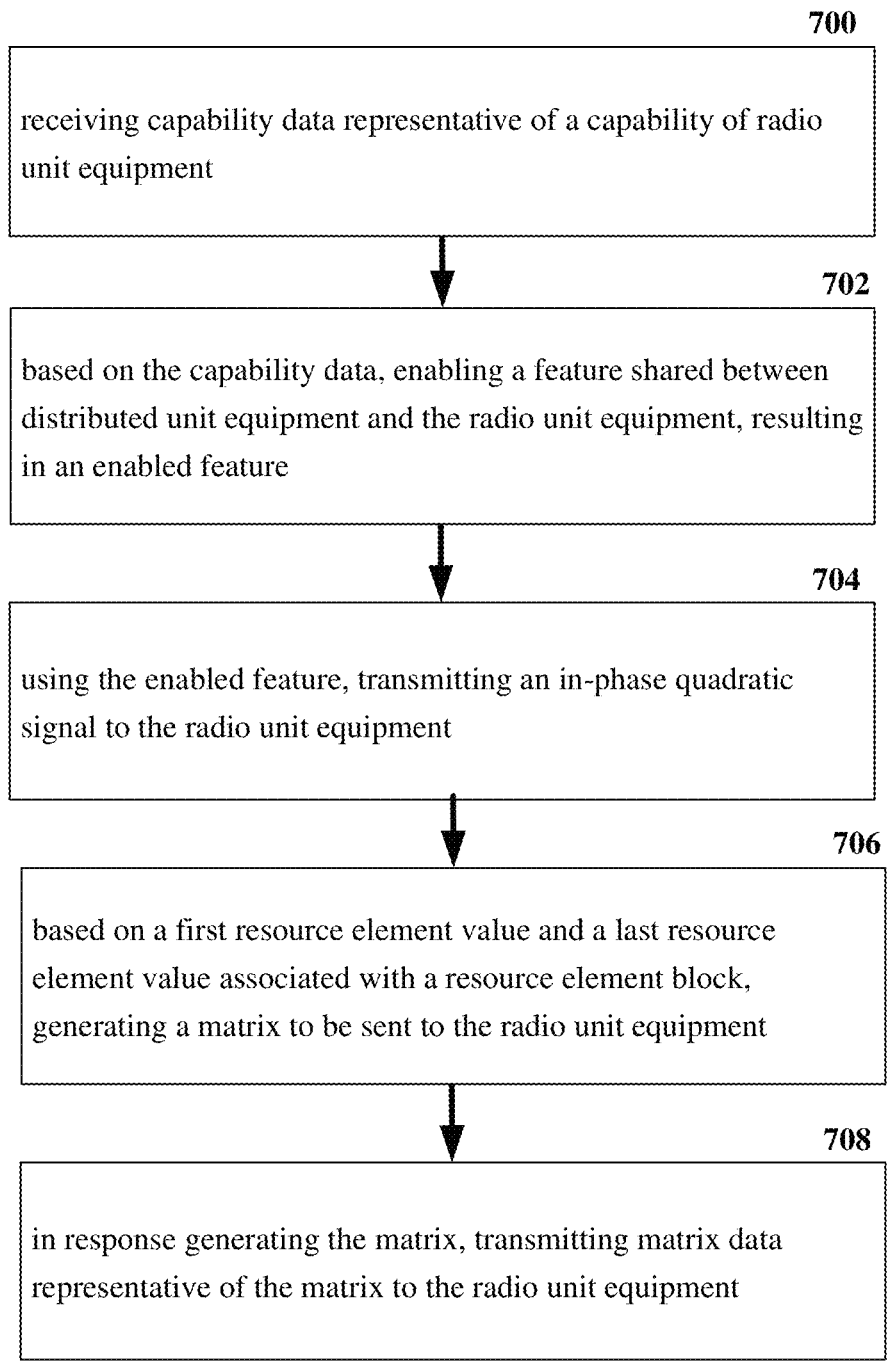
FIG. 7 illustrates an example flow diagram for a system for facilitating beamforming utilizing interpolation for a 5G network according to one or more embodiments.

Referring now to FIG. 7, illustrated is an example flow diagram for a system for facilitating beamforming utilizing interpolation for a 5G network according to one or more embodiments.

At element 700, the system can facilitate receiving capability data representative of a capability of radio unit equipment. Based on the capability data, at element 702 the system can comprise enabling a feature shared between distributed unit equipment and the radio unit equipment, resulting in an enabled feature. At element 704, the system can facilitate using the enabled feature, transmitting an in-phase quadratic signal to the radio unit equipment. Based on a first resource element value and a last resource element value associated with a resource element block, at element 706, the system can facilitate generating a matrix to be sent to the radio unit equipment. Furthermore, in response generating the matrix, at element 708, the system can facilitate transmitting matrix data representative of the matrix to the radio unit equipment.

Figure 8:
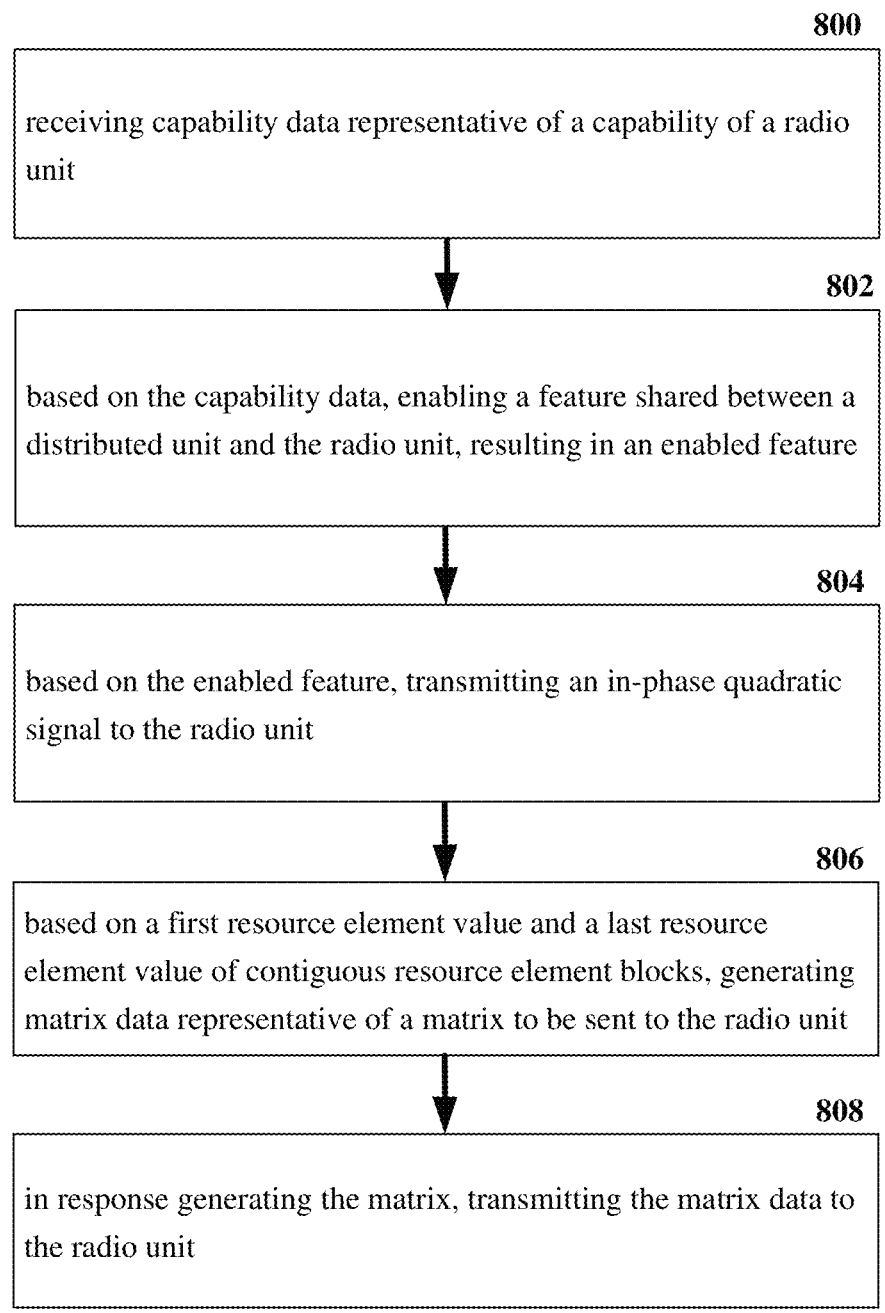
FIG. 8 illustrates an example flow diagram for a machine-readable medium for facilitating beamforming utilizing interpolation for a 5G network according to one or more embodiments.

Referring now to FIG. 8, illustrated is an example flow diagram for a machine-readable medium for facilitating beamforming utilizing interpolation for a 5G network according to one or more embodiments.

At element 800, the machine-readable medium that can perform the operations comprising receiving capability data representative of a capability of a radio unit. Based on the capability data, at element 802, the machine-readable medium can perform the operations comprising enabling a feature shared between a distributed unit and the radio unit, resulting in an enabled feature. Based on the enabled feature, at element 804, the machine-readable medium can perform the operations comprising transmitting an in-phase quadratic signal to the radio unit. Additionally, based on a first resource element value and a last resource element value of contiguous resource element blocks, at element 806, the machine-readable medium can perform the operations comprising generating matrix data representative of a matrix to be sent to the radio unit. Furthermore, in response generating the matrix, at element 808, the machine-readable medium can perform the operations comprising transmitting the matrix data to the radio unit.

Figure 9:
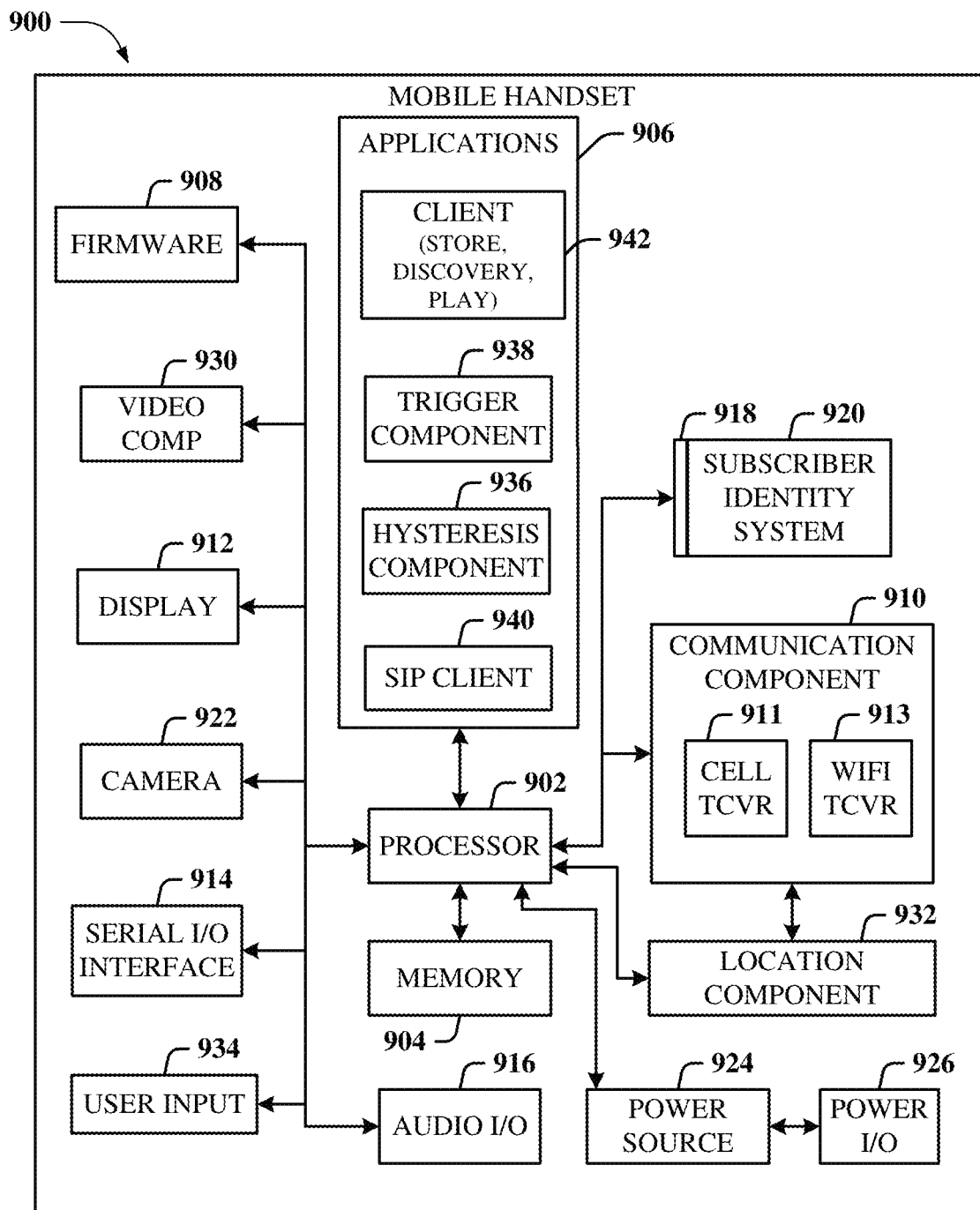
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
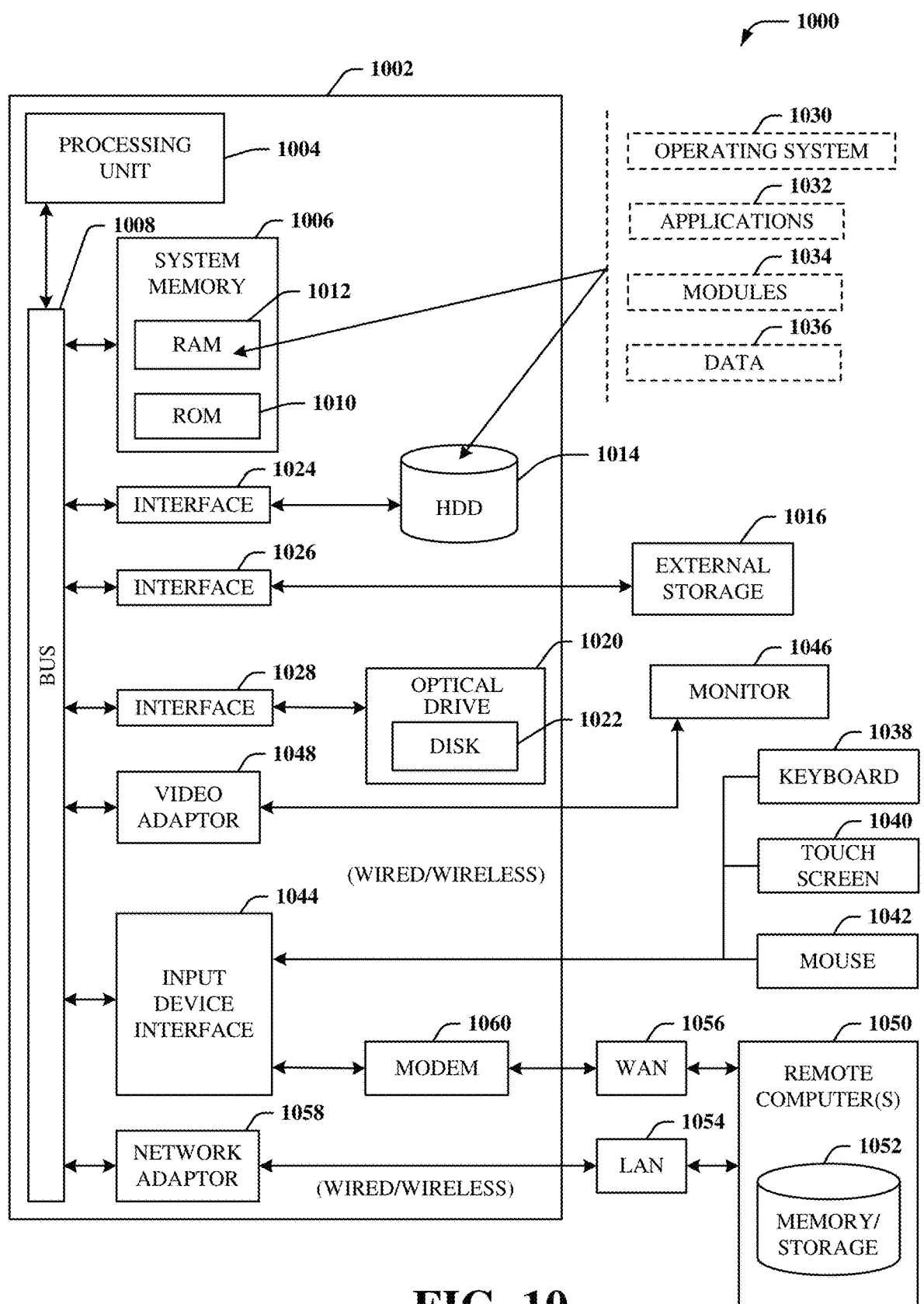
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by distributed unit equipment comprising a processor, capability data representative of a capability of radio unit equipment;
   based on the capability data, enabling, by the distributed unit equipment, a feature shared between the distributed unit equipment and the radio unit equipment, resulting in an enabled feature;
   based on the enabled feature, sending, by the distributed unit equipment to the radio unit equipment, an in-phase quadratic signal;
   based on a first resource element and a last resource element of a contiguous block of resource elements, generating, by the distributed unit equipment, matrix data representative of a matrix to be sent to the radio unit equipment; and
   in response to generating the matrix data, sending, by the distributed unit equipment, the matrix data to the radio unit equipment.

2. The method of claim 1, wherein the feature is a type of interpolation to be utilized by the radio unit equipment.

3. The method of claim 2, wherein the interpolation is a spline interpolation.

4. The method of claim 2, wherein the interpolation is a linear interpolation.

5. The method of claim 1, further comprising:
in response to enabling the feature, sending, by the distributed unit equipment, feature data, representative of the enabled feature, within a compression header.

6. The method of claim 1, wherein the capability data is first capability data representative of a first capability, and further comprising:
sending, by the distributed unit equipment, second capability data representative of a second capability of the distributed unit equipment.

7. The method of claim 6, wherein the first capability and the second capability are a same capability.

8. A system, comprising:
a processor; and
a memory that stores executable instructions that, when executed by the processor, facilitate performance of operations, comprising:
receiving capability data representative of a capability of radio unit equipment;
based on the capability data, enabling a feature shared between distributed unit equipment and the radio unit equipment, resulting in an enabled feature;
using the enabled feature, transmitting an in-phase quadratic signal to the radio unit equipment;
based on a first resource element value and a last resource element value associated with a resource element block, generating a matrix to be sent to the radio unit equipment; and
in response generating the matrix, transmitting matrix data representative of the matrix to the radio unit equipment.

9. The system of claim 8, wherein the operations further comprise:
sending compression data representative of a type of compression to the radio unit equipment.

10. The system of claim 9, wherein the compression data is sent via a compression header.

11. The system of claim 8, wherein the operations further comprise:
sending compression parameter data, representative of a type of interpolation, to be utilized by the radio unit equipment.

12. The system of claim 11, wherein the type of the interpolation is a piecewise interpolation.

13. The system of claim 11, wherein the type of the interpolation is a quadratic interpolation.

14. The system of claim 11, wherein the type of the interpolation is a polynomial interpolation.

15. A non-transitory machine-readable medium, comprising executable instructions that, when executed by a processor, facilitate performance of operations, comprising:
receiving capability data representative of a capability of a radio unit;
based on the capability data, enabling a feature shared between a distributed unit and the radio unit, resulting in an enabled feature;
based on the enabled feature, transmitting an in-phase quadratic signal to the radio unit;
based on a first resource element value and a last resource element value of contiguous resource element blocks, generating matrix data representative of a matrix to be sent to the radio unit; and
in response generating the matrix, transmitting the matrix data to the radio unit.

16. The non-transitory machine-readable medium of claim 15, wherein the operations further comprise:
sending a coefficient, associated with the lowest resource element value, to the radio unit.

17. The non-transitory machine-readable medium of claim 16, wherein the coefficient is a first coefficient, and wherein the operations further comprise:
sending a second coefficient, associated with the highest resource element value, to the radio unit.

18. The non-transitory machine-readable medium of claim 17, wherein the operations further comprise:
facilitating interpolating the first coefficient and the second coefficient based on an enabled linear interpolation feature.

19. The non-transitory machine-readable medium of claim 17, wherein the operations further comprise:
facilitating interpolating the first coefficient and the second coefficient based on an enabled polynomial interpolation feature.

20. The non-transitory machine-readable medium of claim 17, wherein the operations further comprise:
facilitating interpolating the first coefficient and the second coefficient based on an enabled spline interpolation feature.

* * * * *